E. R. JONES.
AUTOMOBILE BUMPER.
APPLICATION FILED JAN. 9, 1922.
1,416,834.
Patented May 23, 1922.
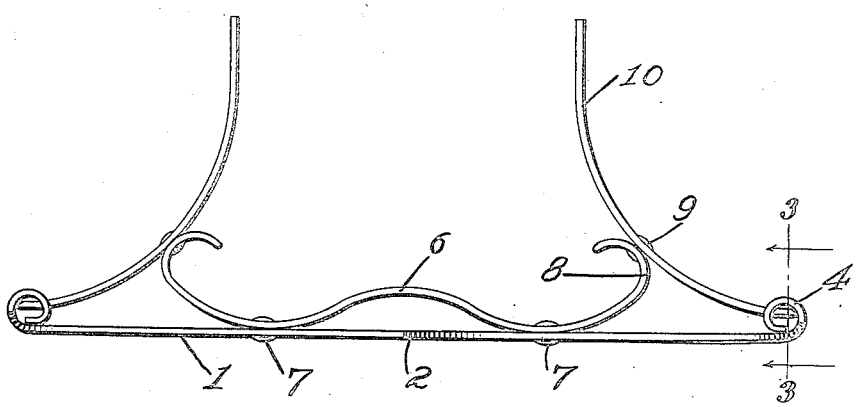
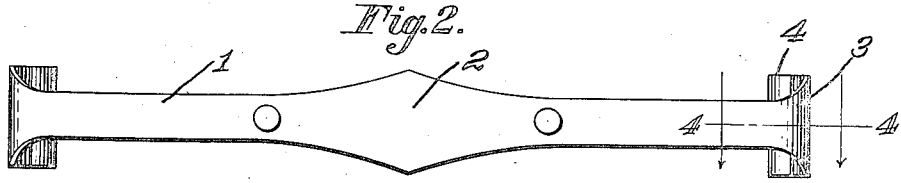
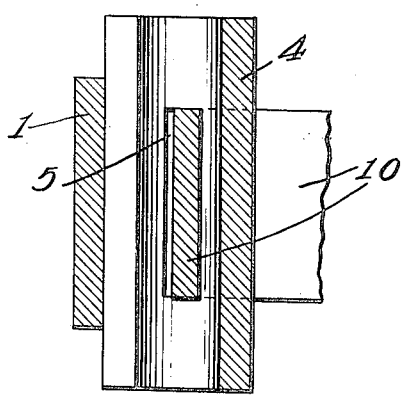
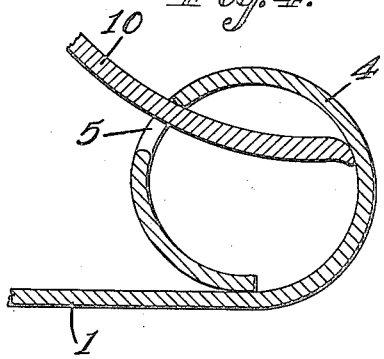
Inventor
E. R. Jones.
By
Attorney

UNITED STATES PATENT OFFICE.

EVERETT R. JONES, OF WYANDOTTE, MICHIGAN, ASSIGNOR OF ONE-HALF TO WILLIAM E. ALLEN, OF WYANDOTTE, MICHIGAN.

AUTOMOBILE BUMPER.

1,416,834.

Specification of Letters Patent. Patented May 23, 1922.

Application filed January 9, 1922. Serial No. 527,960.

*To all whom it may concern:*

Be it known that I, EVERETT R. JONES, a citizen of the United States, residing at Wyandotte, in the county of Wayne and State of Michigan, have invented a new and useful Automobile Bumper, of which the following is a specification.

This invention relates to a bumper for automobiles, one of its objects being to provide an attractive and durable structure of this character so constructed as to more readily absorb shocks than will bumpers of the usual types, there being a novel movable connection between certain of the bumpers whereby the bumper is enabled to be made wider than ordinarily, will stand excessive shocks, and can be used to protect not only the front of the body of the car but also the fenders.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown. In said drawings—

Figure 1 is a plan view of the bumper.

Figure 2 is a front elevation thereof.

Figure 3 is an enlarged section on line 3—3, Figure 1.

Figure 4 is an enlarged section on line 4—4, Figure 2.

Referring to the figures by characters of reference 1 designates the front cross strip of the bumper, this strip being preferably of greater width at the center than at other points, the wide portion being indicated at 2. The ends of the strip are of increased width as shown at 3 and are curled or rolled backwardly and inwardly to provide terminal barrels 4 each of which has a vertical slot 5 in the inner side portion thereof. Arranged back of the strip 1 is a bow string 6 fastened by rivets 7 or the like to the strip 1 at opposite sides of the enlarged portion 2. The ends of this spring are curved backwardly and inwardly as shown at 8 and are riveted or otherwise fastened as at 9 to side strips 10. These side strips are of strong spring metal and their forward ends project through the slots 5 and bear against the walls of the barrels 4. There are no connecting means provided for securing the strips 9 to the barrel. On the contrary there is both a slidable and pivotal connection provided between these parts by reason of the peculiar manner in which they are assembled. The rear ends of the strips 10 are adapted to be fastened to an automobile in the usual or any preferred manner.

When the device is in position the ends of the strip 1 will be extended laterally sufficient distances to protect the fenders of the vehicle. Any shock received by the middle portion of the strip 1 will be transmitted to the spring 6 and thence to the curved spring side strips 10. As the side strips have a sliding as well as a pivotal connection with the barrels 4 the bumper can receive an extremely severe shock without becoming injured because a backward impact against the center of the strip 1 will allow the ends of the strip to have a slight forward movement upon and relative to the strips 10. Thus the shock will be more readily absorbed than should the parts 10 and 1 be integral.

What is claimed is:—

1. A bumper for automobiles and the like comprising a front strip having terminal barrels, and forwardly diverging side strips projecting into and adapted to slide and swing within the barrels, all of the strips being of spring material.

2. A bumper for motor vehicles comprising a front strip having rearwardly turned end portions, side strips diverging forwardly and slidable within said end portions, said side and front strips being formed of spring material, and a spring connection between the front and side strips.

3. A bumper for motor vehicles comprising a front strip having backwardly curled end portions provided with slots, forwardly diverging side strips projecting into the slots in the respective curled portions and mounted to move freely therein, a bow spring secured back of the front strip, and curved spring connections integral with the bow spring and joining the front and side strips, said front and side strips being formed of spring material.

In testimony that I claim the foregoing as my own, I have hereto affixed my signature in the presence of two witnesses.

EVERETT R. JONES.

Witnesses:
　EDW. HAAS,
　WM. RUMMEL.